United States Patent
Loudermilk et al.

(10) Patent No.: US 6,393,402 B1
(45) Date of Patent: *May 21, 2002

(54) METHOD FOR PRODUCING REMOTELY A PICTURE DISPLAY DEVICE STORING ONE OR MORE ASSOCIATED AUDIO MESSAGES

(75) Inventors: Alan R. Loudermilk, Chicago; Wayne D. Jung, Morton Grove, both of IL (US)

(73) Assignee: LJ Talk LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/006,767

(22) Filed: Dec. 6, 2001

Related U.S. Application Data

(63) Continuation of application No. 09/782,921, filed on Feb. 13, 2001, which is a continuation of application No. 09/399,127, filed on Sep. 20, 1999, now Pat. No. 6,263,310, which is a continuation of application No. 08/788,625, filed on Jan. 24, 1997, now Pat. No. 5,956,682, which is a continuation-in-part of application No. 08/617,708, filed on Apr. 1, 1996, now Pat. No. 6,185,851, which is a continuation-in-part of application No. 08/121,955, filed on Sep. 15, 1993, now Pat. No. 5,504,836, which is a continuation of application No. 07/711,153, filed on Jun. 6, 1991, now abandoned.

(51) Int. Cl.$^7$ .............................. G10L 11/00; A47G 1/06
(52) U.S. Cl. .......................................... 704/272; 40/717
(58) Field of Search ............................. 704/272; 40/717

(56) References Cited

U.S. PATENT DOCUMENTS

| | | | |
|---|---|---|---|
| 3,590,525 A | 7/1971 | Tomaro | 446/408 |
| 3,703,045 A | 11/1972 | Nyman | 40/720 |
| 3,771,246 A | 11/1973 | Ebner | 40/720 |
| 3,857,191 A | 12/1974 | Sadorus | 360/2 X |
| 3,975,850 A | 8/1976 | Giaume | 40/606 |
| 4,169,970 A | 10/1979 | Opiela et al. | 369/69 X |
| 4,195,729 A | 4/1980 | Macken | 40/720 |
| 4,222,188 A | 9/1980 | Tarrant et al. | 40/455 |
| 4,299,041 A | 11/1981 | Wilson | 40/124.02 |
| 4,318,188 A | 3/1982 | Hoffmann | 395/2 |

(List continued on next page.)

FOREIGN PATENT DOCUMENTS

| | | | |
|---|---|---|---|
| DK | 3532259 | 3/1987 | 381/51 |

OTHER PUBLICATIONS

Information Storage Devices, Inc. "ISD1012A/1016A/1020A Single Chip Voice Record/Playback Devices," Feb. 1991, pp. 1–16.

*Primary Examiner*—Tãlivaldis Ivars Šmits
(74) *Attorney, Agent, or Firm*—Loudermilk & Associates

(57) ABSTRACT

A picture frame and accompanying audio message circuit is provided such that one or more desired audio messages stored in the audio message circuit associated with one or more display pictures can be played upon the touching of the pictures or the frame, or in response to a voice recognition device sensing an audio command associated with the particular audio message and/or pictures. When audio message playback is desired, a switch on the frame or under a protective cover for the picture is activated by touching, or a position sensitive device may be used to sense whether a particular position on the picture has been touched. Digital or analog information representing the desired audio message is retrieved from a memory device, which is subsequently transmitted to a speaker which produces the desired audio message perceptible to a human. In other embodiments, multiple picture and multiple messages are provided such that the user can touch a particular picture, or the switch associated with that picture, and an audio message corresponding to the picture is then played through the speaker. In still other embodiments, a system is provided with a plurality of pictures mounted in the perimeter faces of a cube or other geometrical shape, each picture having associated with it a switch for activating a message or plurality of messages. In still other embodiments, a position sensitive device or a voice recognition device is utilized to initiate audio message playback.

29 Claims, 10 Drawing Sheets

U.S. PATENT DOCUMENTS

| | | | |
|---|---|---|---|
| 4,327,251 A | 4/1982 | Fomenko et al. | 381/51 |
| 4,389,541 A | 6/1983 | Nakano et al. | 381/51 |
| 4,531,310 A | 7/1985 | Acson et al. | 40/455 X |
| 4,541,188 A | 9/1985 | Sadorus | 40/717 |
| 4,611,262 A | 9/1986 | Galloway et al. | 206/232 |
| 4,696,653 A | 9/1987 | McKeefery | 446/303 |
| 4,703,573 A | 11/1987 | Montgomery et al. | 40/455 |
| 4,748,756 A | 6/1988 | Ross | 40/455 X |
| 4,791,741 A | 12/1988 | Kondo | 40/455 X |
| 4,908,845 A | 3/1990 | Little | 379/51 |
| 4,934,079 A | 6/1990 | Hoshi | 40/455 X |
| 4,958,150 A | 9/1990 | Dabbaj | 40/476 |
| 4,990,092 A | 2/1991 | Cummings | 40/455 |
| 5,024,011 A | 6/1991 | Collins | 446/420 |
| 5,045,327 A | 9/1991 | Tarlow et al. | 395/2.81 |
| 5,063,698 A | 11/1991 | Johnson et al. | 40/124.02 |
| 5,136,655 A | 8/1992 | Bronson | 381/43 |
| 5,182,872 A | 2/1993 | Lee et al. | 40/455 X |
| 5,184,971 A | 2/1993 | Williams | 40/337 X |
| 5,209,665 A | 5/1993 | Billings et al. | 434/169 |
| 5,499,465 A | 3/1996 | Manico | 40/717 |

METHOD FOR PRODUCING REMOTELY A PICTURE DISPLAY DEVICE STORING ONE OR MORE ASSOCIATED AUDIO MESSAGES

This is a continuation of application Ser. No. 09/782,921, filed Feb. 13, 2001, which is a continuation of application Ser. No. 09/399,127, filed Sep. 20, 1999, now U.S. Pat. No. 6,263,310, which is a continuation of application Ser. No. 08/788,625, filed Jan. 24, 1997, now U.S. Pat. No. 5,956,682, which is a continuation-in-part of application Ser. No. 08/617,708, filed Apr. 1, 1996, now U.S. Pat. No. 6,185,851, which is a continuation-in-part of application Ser. No. 08/121,955, filed Sep. 15, 1993, now U.S. Pat. No. 5,504,836, which is a continuation of application Ser. No. 07/711,153, filed Jan. 6, 1991 now abandoned.

BACKGROUND OF THE INVENTION

1. Field of the Invention

The present invention relates to pictures and audio messages and more particularly to a picture frame with an audio message circuit in which one or more audio messages associated with displayed picture(s) are played upon touching the picture(s) or the frame, or in response to touching of a position sensitive device.

2. Description of the Prior Art

It is known to display pictures such as photographs of family members or momentous occasions or the like inside of a frame. The frame typically enhances the aesthetics of the displayed picture, provides protection for the picture and/or provides a suitable means for mounting or displaying the picture. Such ordinary frames, however, present a still picture only and do not have an audio message circuit as a part of the frame by which an audio message associated with the displayed picture is played upon touching the picture or the frame.

It is also known in the art to have greeting cards or the like such that when the greeting card is opened, prerecorded tonal music is played. Such prior art devices, however, do not provide a frame for the display of desired pictures, and further do not allow for an arbitrary audio message or messages such as the voice of a user to be activated when desired.

SUMMARY OF THE INVENTION

The present invention overcomes the disadvantages and limitations of the prior art by providing a picture frame and accompanying audio message circuit such that one or more desired audio messages associated with one or more displayed pictures can be played upon the touching of the pictures or the frame. The present invention is particularly suited for integrated and low cost construction such that a picture frame with associated audio message capabilities is provided for displaying momentous or family photographs or for educational purposes.

When audio message playback is desired, a switch on the frame or under a protective cover for the picture (called a "plate" herein) is activated by touching. Under CPU control, digital information representing the desired audio message is retrieved from a memory device, which is subsequently converted to an analog signal and transmitted to a speaker which produces the desired audio message perceptible to a human. In other embodiments, multiple pictures and multiple messages are provided such that the user can touch a particular picture, or the switch associated with that picture, and an audio message corresponding to that picture is then played through the speaker.

In still other embodiments, a system is provided such that an image is captured electronically through a camera or the like. The electronic information representing the picture, and associated electronic information representing the audio message, is then transmitted over a suitable transmission medium such that it is remotely received. On the receiving end, a still picture is produced for insertion into the picture frame, and the received audio message is input into a voice message circuit. With these embodiments, the picture frame and voice message circuit of the present invention can be produced remotely from the origin of the picture and the audio message. Such embodiments have application, for example, for the remote delivery of a commemorative picture and message such as to a sick relative located in a far off location. All of this is accomplished in the prevent invention with an integrated and low cost construction, providing advantages not present in the prior art devices.

In still other embodiments, the frame may be formed as a geometric shape, with pictures positioned in various faces of the geometric shape, with playback of a partcular message or messages associated with a picture positioned in a particular face initiated by touching of the particular picture/face. In still other embodiments, a position sensitive device, such as a touch screen is included in order to provide particular messages to be associated and stored at particular positions with respect to the displayed picture.

Accordingly, it is an object of the present invention to provide a picture frame with an audio message circuit in which one or more audio messages associated with a displayed picture are played upon the touching of the picture or the frame.

Another object of the present invention is to provide a picture frame with multiple pictures, with multiple audio messages associated with each of the displayed pictures, such that a user can initiate playback of an audio message associated with a particular picture by activating a switch associated with that particular picture.

It is another object of the present invention to provide a picture frame that can play an audio message with the audio message in the voice of a desired person.

It is yet another object of the present invention to provide a picture frame in which the audio message is programmable by the user.

It is still another object of the present invention to provide a picture frame in which the audio messages are stored under CPU control such that the audio message playback can be initiated by touching switches on the frame or a switch associated with the picture itself. It is an object of this invention to provide a system for providing the picture to be inserted in the frame and the audio message to be stored in the audio message circuit remotely from the point at which the picture and audio message are generated.

Finally, it is an object of the present invention to provide such a picture frame in form of a geometric shape, or a picture frame incorporating a position sensitive device.

DETAILED DESCRIPTION OF THE PREFERRED EMBODIMENTS

With reference to the figures, the preferred and alternate embodiments of the present invention will now be described. Although the present invention will be described in terms of pictures or photographs, it should be understood that any fixed object from which a visual image can be perceived, such as sketches, drawings, lettering or the like, or actual objects in a suitable enclosure such as to be framed, also can be utilized with the present invention. Similarly, while the present invention will be described in terms of audio messages such as ordinary human speech, it should be understood that any audio information, such as music, animal or wildlife noises or the like also can be utilized with the present invention.

Figure 1A:
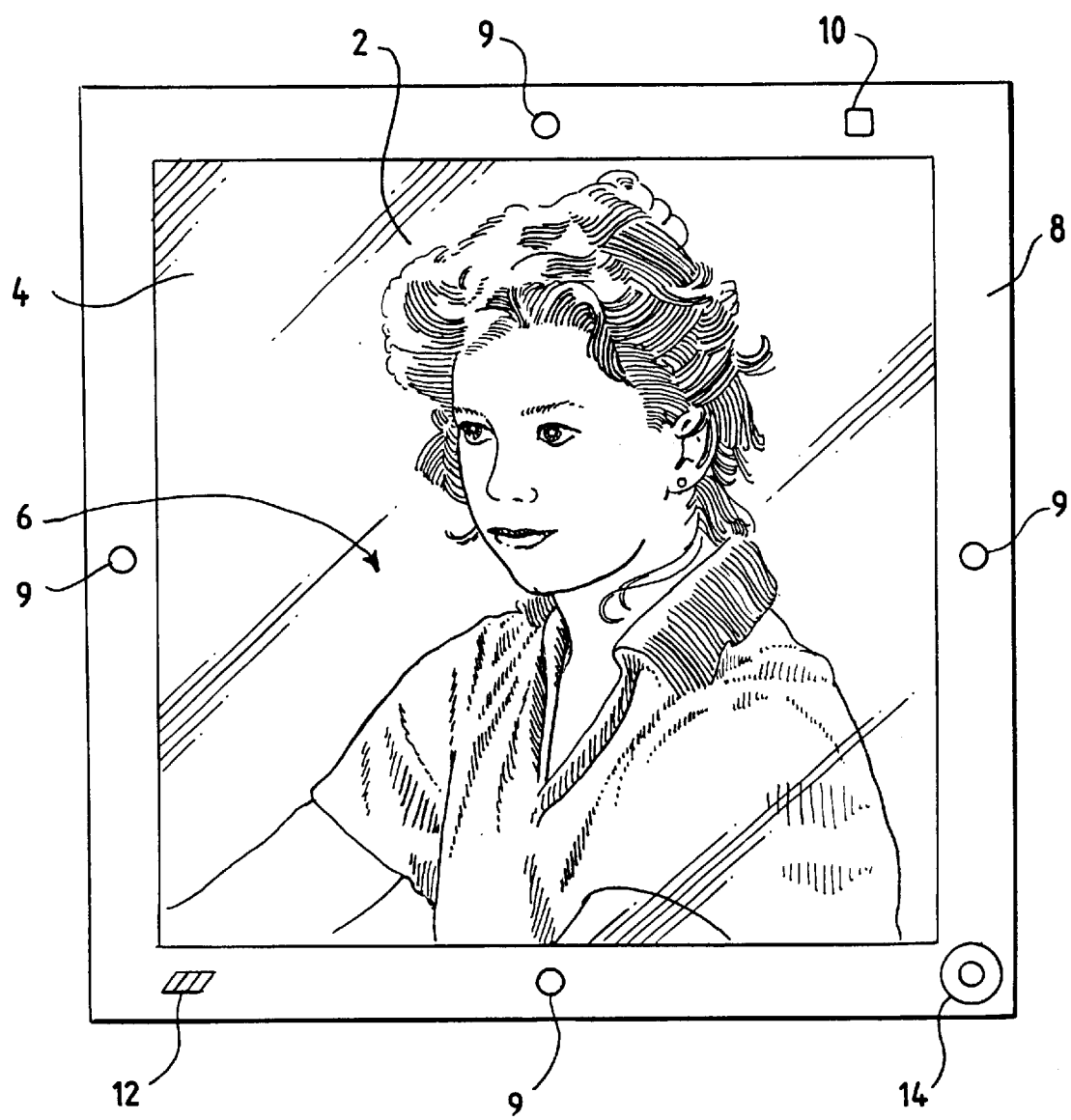
FIG. 1A is an illustration of a single picture embodiment of the present invention.
Figure 1B:
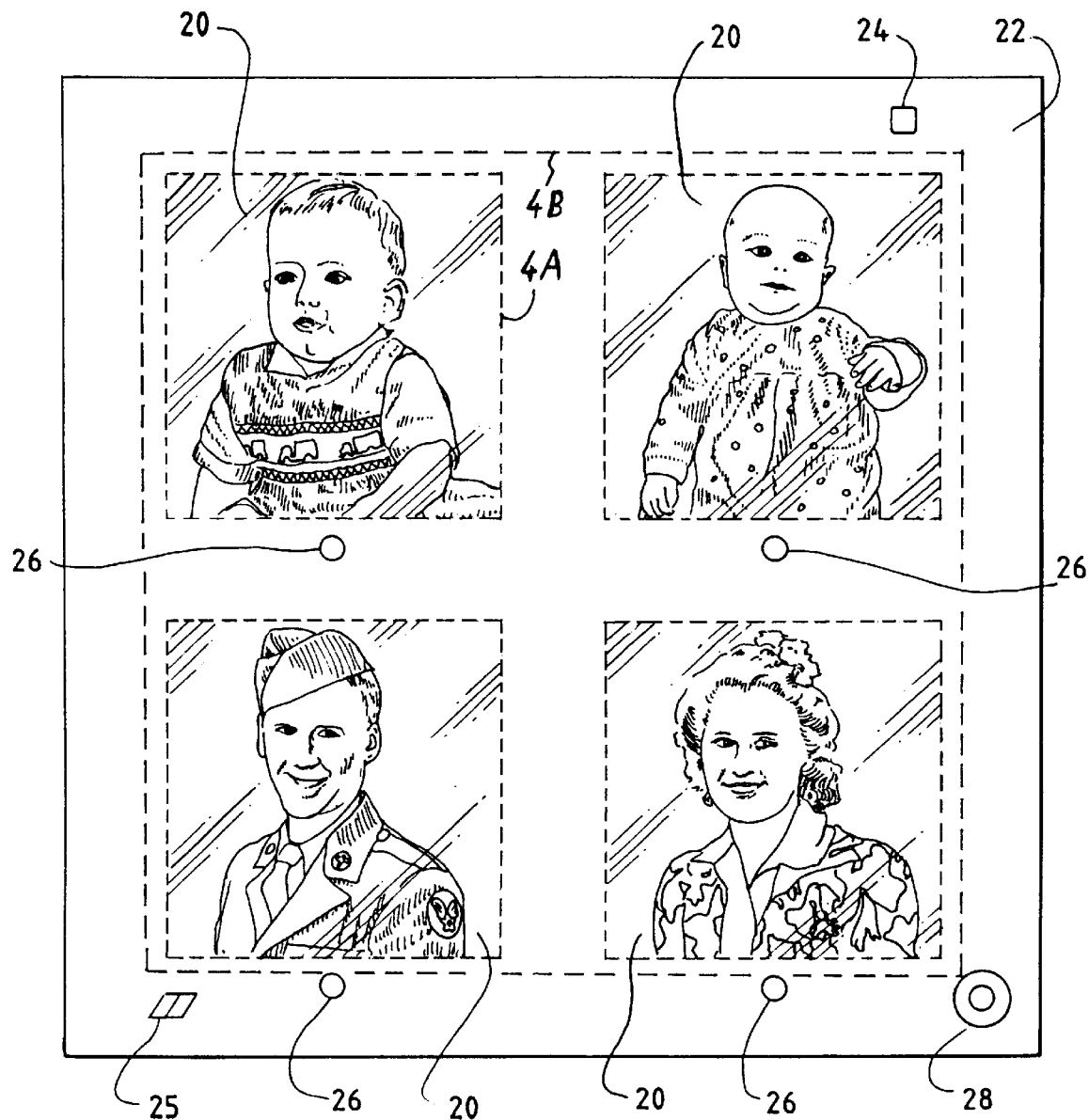
FIG. 1B is an illustration of a multi-picture embodiment of the present invention.

FIGS. 1A and 1B illustrate two embodiments of the present invention. FIG. 1A illustrates picture 2, which can be any fixed image such as a still picture or portrait of a person, inside of frame 8. Picture 2 is affixed to or contained in frame 8 in any suitable way, such as by inserting in grooves or slots (not explicitly shown) in the rear of frame 8 (such as in ordinary picture frames), or may be affixed by way of adhesives or by mounting a retainer plate (not explicitly shown) with screws or the like to frame 8 with picture 2 contained between the retainer plate and frame 8. Picture 2 is covered by plate 4, which can be any transparent covering, either rigid or flexible, and in the preferred embodiment is glass or plastic. Plate 4 is affixed to frame 8 in any suitable way much as with picture 2 described above.

Attached to frame 8 is speaker 14, from which audio messages are transmitted. The playing of audio messages is initiated by activation of one or more switches 9, which can be located at suitable location(s) around the periphery of frame 8. Switches 9 can be located at other locations on frame 8, such as on the top or bottom of frame 8 (if located on the bottom of frame 8, switch 9 may have a spring offset so that the weight of frame 8 itself does not activate the switch) or on the rear of frame 8. What is important is that a user of the device have a mechanism to initiate playback of audio messages. As indicated by sensor switch 6, the audio message playback initiation also may be accomplished by way of a sensor or switch attached to, or part of plate 4. Sensor switch 6 can be any suitable mechanism, such as a capacitive or membrane switch located under plate 4 or near the periphery of frame 8 so as to be unnoticeable to the user. In such embodiments, audio message playback is initiated by the user directly touching plate 4, which activates sensor switch 6.

In certain embodiments, frame 8 also includes microphone 12, which can be any suitable device for transducing incoming audio information (such as a human voice) into electrical signals for subsequent processing and storage (see discussion of FIG. 2 below). Microphone 12 provides easy user programmability of the audio messages to be replayed, and in particular programmability of the audio messages in the voice of the user or some other desired person. In other embodiments, microphone 12 is not provided, and the audio messages are provided by the manufacturer or supplier of the unit, although even in these embodiments the audio message may be the voice of the user or some other desired person or thing.

In another embodiment, the audio message circuit contains multiple messages associated with the displayed picture, with playback of the multiple messages initiated by multiple activations of the sensor or other switch (i.e., multiple message scrolling with multiple switch activations, etc.).

With reference to FIG. 1B, another embodiment of the present invention will be described. FIG. 1B illustrates frame 22 containing multiple pictures 20. The embodiment of FIG. 1B also includes multiple audio messages such that one or more messages correspond with each of the displayed pictures (in certain embodiments, multiple messages may be scrolled with multiple switch activations, as described above with reference to FIG. 1A). As discussed below, a mechanism is provided for the user to initiate audio message playback of the particular message(s) associated with particular pictures. For example, one picture may be a picture of the user's mother, with the audio message associated with that picture being the mother's voice, while another picture may be a picture of the user's father, with the audio message associated with that picture being the father's voice. The user, such as a child, can touch the picture of the mother (or a switch near the picture of the mother) and hear a message in the mother's voice, and similarly with the picture of the father.

More generally, pictures of a number of persons can be included in the embodiment of FIG. 1B, with specific audio messages associated with each of the persons. In another specific embodiment, the pictures are of selected animals, with the audio messages being information regarding those animals, or wildlife sounds made by the animals themselves. Many other combinations of pictures and audio messages can be utilized in the present invention; the choices are limited only by the imagination of the user.

In FIG. 1B, pictures 20 are covered by multiple plates or a single plate (not explicitly shown, but such plate(s) are similar to plate 4 of FIG. 1A). Pictures 20 and the plate(s) are affixed to frame 22 in any suitable way, much as was described with respect to picture 2, plate 4 and frame 8 of FIG. 1A. Mounted on frame 22 is speaker 28 and, in certain embodiments, microphone 25. Attached to frame 22 are multiple switches 26 associated with pictures 20. Audio message playback of a particular message associated with a particular picture 20 is initiated by touching one of switches 26 associated with the particular picture. As discussed with respect to FIG. 1A, in alternate embodiments the audio message playback is initiated by way of a sensor switch attached to the plate(s) covering pictures 20 (similar to plate 4 and sensor switch 6 of FIG. 1A). In such embodiments, audio message playback of a particular message associated with a particular picture 20 is initiated by directly touching the plate covering that particular picture 20, thereby activating the sensor switch (again, similar to sensor switch 6 of FIG. 1A).

Figure 2:
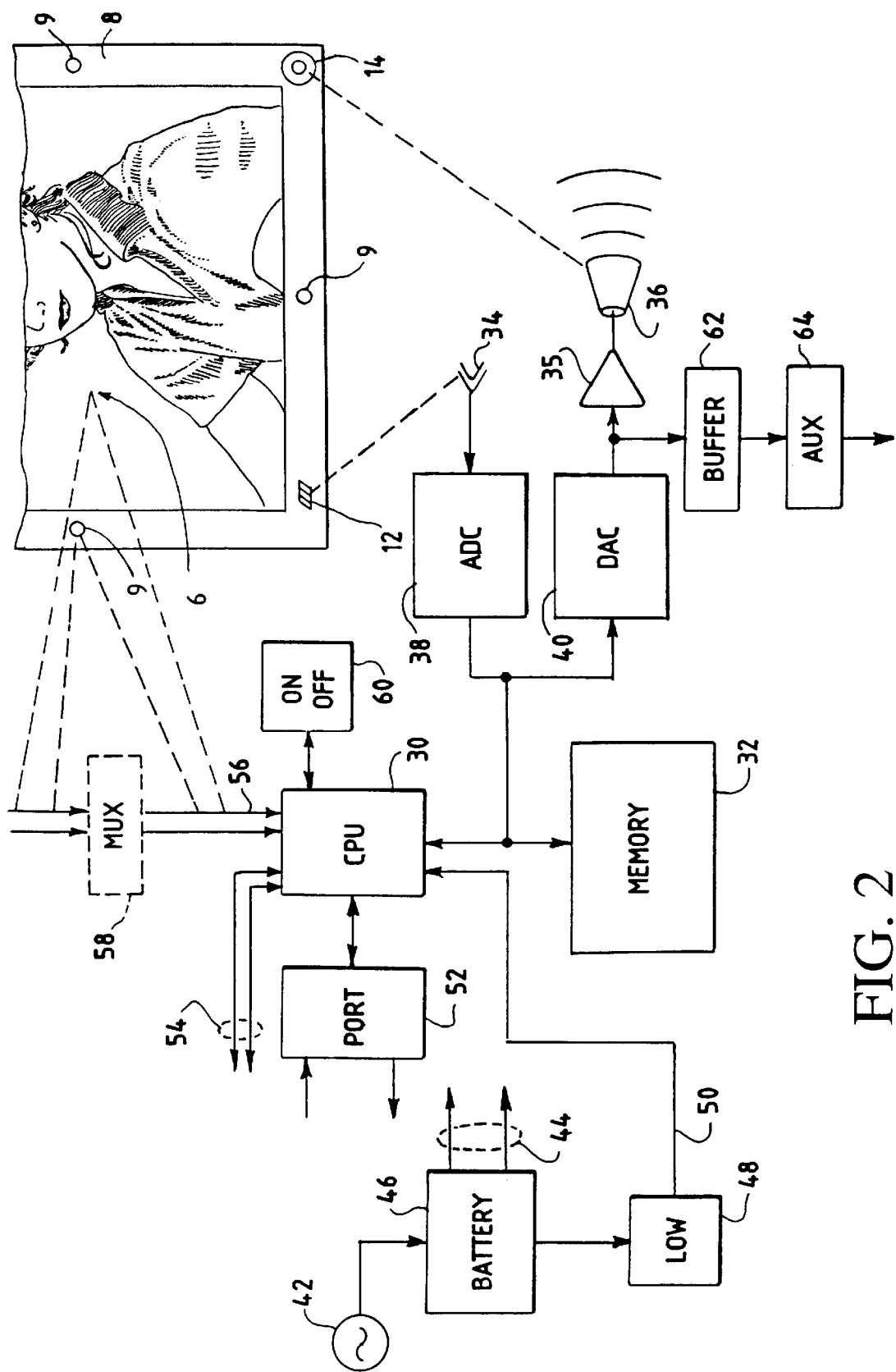
FIG. 2 is a diagram of an embodiment of the audio message circuit of the present invention.

Referring now to FIG. 2, an audio message circuit for use in an embodiment of the present invention will be described.

Microphone 34 receives audio information (such as a desired voice message of a user or a desired person or thing) and converts the audio information into electrical signals which are input to analog to digital converter ("ADC") 38. The digital output of ADC 38 is input to CPU 30 for subsequent processing and storage in memory 32. CPU 30 is programmed to provide monitoring of switch inputs 56 and/or switch multiplexer 58, overall circuit coordination and control, and, in the preferred embodiment, compression and expansion of the stored audio message using known compression/expansion techniques. CPU 30 can be any suitable microprocessor or digital processing unit.

Memory 32 can be dynamic or static random access memory ("RAM") (with or without separate battery back-up), read only memory ("ROM"), programmable read only memory, either UV or electrically erasable, or non-erasable ("PROM"), or one time programmable memory ("OTP") (a certain type of PROM that is field programmable but only one time), optical disks, memory cards, serial memory (such as bubble memory) or any other suitable device for storing digital information.

For audio message playback, under the control of CPU 30, digital information representing the audio message is output from memory 32 to digital to analog converter ("DAC") 40 over the bus connected to CPU 30 and memory 32. The analog signal output of DAC 40 is connected to amplifier 35, the output of which is connected to speaker 36. Speaker 36 converts the output of amplifier 35 into audio waves perceptible to a human listener. Depending on the desired sound quality, DAC 40 or amplifier 35 may include conventional filtering circuitry for elimination of circuit noise or the like. In alternative embodiments, the output of DAC 40 also is connected to buffer/amplifier 62 which is connected to auxiliary output 64. By use of auxiliary output 64, the present invention may be utilized with a separate external speaker, or the audio messages may be recorded on an external storage device such as a tape recorder (not shown) for purposes of archiving the voice message or the like.

CPU 30 receives control information from control signal input 54 and switch inputs 56. In certain embodiments, switch inputs 56 are received from switch multiplexer 58. Inputs to switch multiplexer 58 include connections from the audio message initiation switches, such as switches 9 or sensor switch 6 of FIG. 1A or switches 26 of FIG. 1B. In response to activation of switches 9 or 26, or sensor switch 6, signals on switch inputs 56 (either directly or through a multiplexer such as multiplexer 58) cause CPU 30 to initiate audio message playback through speaker 36.

In certain embodiments, the audio message to be played back is already in digital form, and thus may be input to CPU 30 by port 52. Port 52 may be any suitable input-output device, serial or parallel, useful for interfacing a CPU to an external digital device. Digital audio information received from port 52 is sent to CPU 30 for processing and storage in memory 32, and for subsequent playback through DAC 40, amplifier 35 and speaker 36. Control of digital information through port 52 may be made by way of control signals 54 in a conventional manner.

Electrical power for the components illustrated in FIG. 2 is provided by power supply 46 over power terminals 44. In the preferred embodiment, power supply 46 is a battery. In other embodiments, power supply 46 is connected to AC power supply 42, which in the preferred embodiment is an ordinary household AC voltage line. In such embodiments, power supply 46 includes circuitry to convert the AC voltage to a suitable DC voltage. In still other embodiments, power supply 46 includes a rechargeable battery, and AC supply 42 supplies current for recharging the battery within power supply 46.

In still other embodiments, power supply 46 has connected to it a circuit for detection and indication of a low battery condition, such as by way of low battery circuit 48. Low battery circuit 48, by way of control line 50, can provide control information to CPU 30 for purposes of, for example, ensuring that the batteries are not completely discharged. In certain embodiments, such as those including a RAM device, upon response from a control signal from low battery circuit 48, CPU 30 disables message playback to conserve the battery charge so as to ensure that the information contained in the RAM is preserved. In other embodiments an indication that the batteries need to be changed or charged is provided to the user by an indicator such as an LED or light (not explicitly shown) in low battery circuit 48.

In the preferred embodiment, the circuit of FIG. 2 is provided with on-off switch 60 such that message playback can be disabled. For example, if the present invention must be transported in a box or suitcase or the like, on-off switch 60 provides a convenient means for ensuring that playback is not initiated by inadvertent touching of switches 9 or sensor switch 6, avoiding problems such as undesired audio message playback and battery discharge. With reference to FIGS. 1A and 1B, on-off switch 60 can be located in an unobtrusive location such as on the rear of frame 8 or 22.

For illustrative purposes, FIG. 2 also shows a fractional view of the embodiment shown in FIG. 1A, with the dashed lines indicating general correspondence between the circuit elements of FIG. 2 and the elements shown on frame 8 of FIG. 1A. As indicated, microphone 34 of FIG. 2 corresponds to microphone 12 of FIG. 1A; speaker 36 of FIG. 2 corresponds to speaker 14 of FIG. 1A; and switch input 56 of FIG. 2 (either directly or through multiplexer 58) corresponds to, for example switches 9 of FIG. 1A (and also sensor switch 6 of FIG. 1A). Similar correspondence could be drawn between elements of FIG. 1B and FIG. 2.

Figure 3:
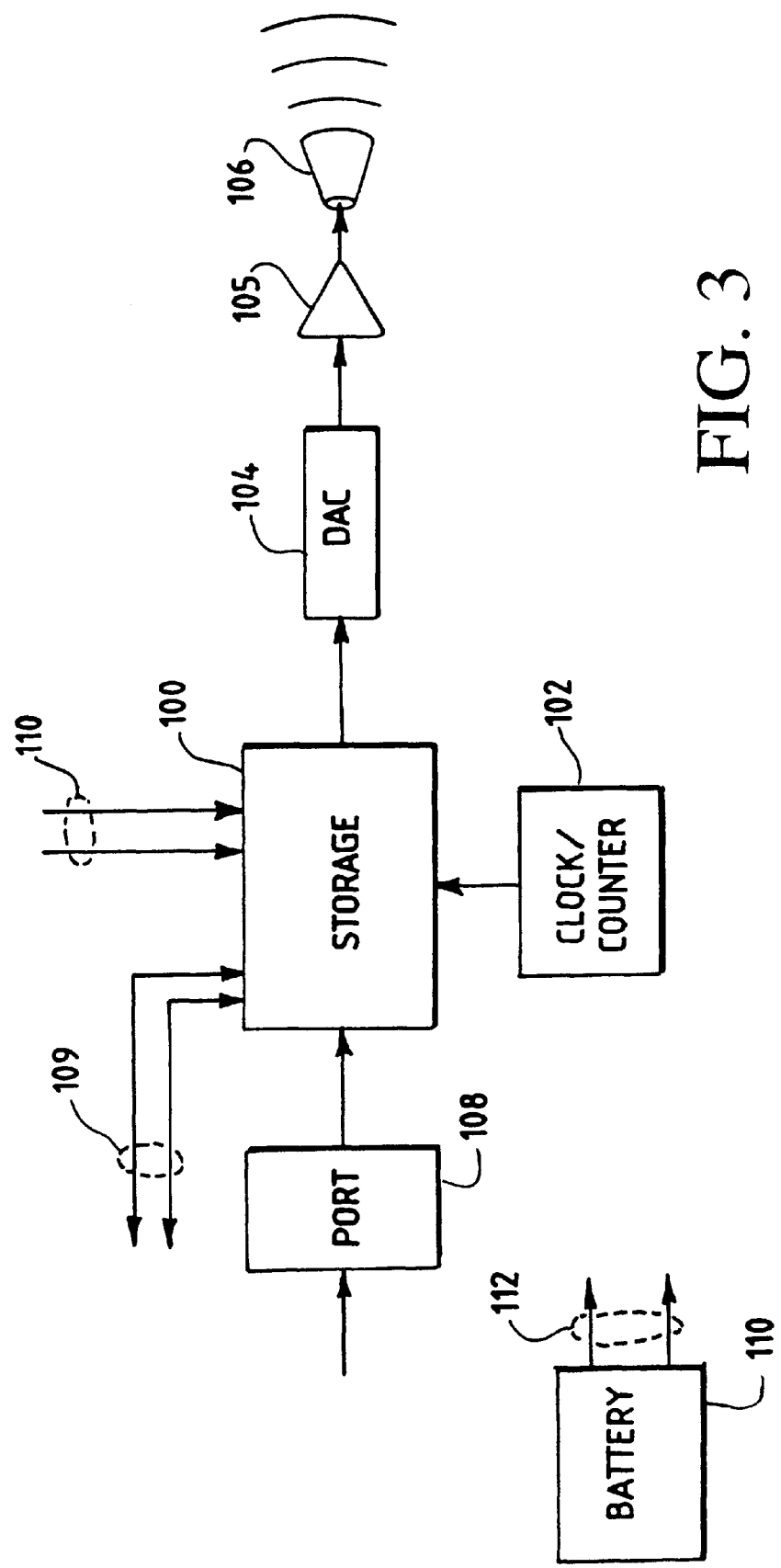
FIG. 3 is a diagram of another embodiment of the audio message circuit of the present invention.

Referring now to FIG. 3, another embodiment of an audio message circuit for use in the present invention will be discussed. Storage circuit 100 contains digital information representing an audio message to be played back, either in compressed or uncompressed form (if compressed, storage circuit 100 also contains a suitable circuit for expansion of the audio message). Digital information is input to storage circuit 100 in the course of manufacturing storage circuit 100 (such as a mask layer PLA or a programmed read only memory device) or may be input by way of port 108 (in the event storage circuit 100 includes, for example, a writable random access memory device or a programmable read only memory device), under control of control input 109. In other embodiments, storage circuit 100 is externally programmed before it is inserted into the circuit shown in FIG. 3. Power supply 110 over power terminals 112 provides power to the circuit elements of FIG. 3 in a manner similar to that of power supply 46 discussed in reference to FIG. 2. In other embodiments, storage circuit 100 is a CPU and memory, such as CPU 30 and memory 32 of FIG. 2.

Message playback from storage circuit 100 is initiated by switch 110. Switch 110 may be, for example, switches 9 or sensor switch 6 of FIG. 1A or switches 26 of FIG.1B. Under control of counting/clocking circuit 102, digital information is received from storage circuit 100, input into DAC 104, with the resulting audio signals applied to amplifier 105, the output of which is connected to speaker 106, by which the audio message is played.

While the embodiments illustrated in FIGS. 2 and 3 store the audio message in digital form, in other embodiments, the audio message is stored in analog form such as on a magnetic tape, phonograph recording(s) or the like.

In still other embodiments of the present invention, light activation of audio message playback is provided. Light sensor 10 of FIG. 1A and light sensor 24 of FIB. 1B generate control signals in response to receiving light that exceeds a threshold intensity. In response to this control signal, which can be input to CPU 30 by way of switch inputs 56 (for example), audio message playback is initiated by CPU 30. In these embodiments, a special message can be played in response to light activation (such as a "good morning" message) as opposed to a possibly different message played in response to switch activation.

Figure 4:
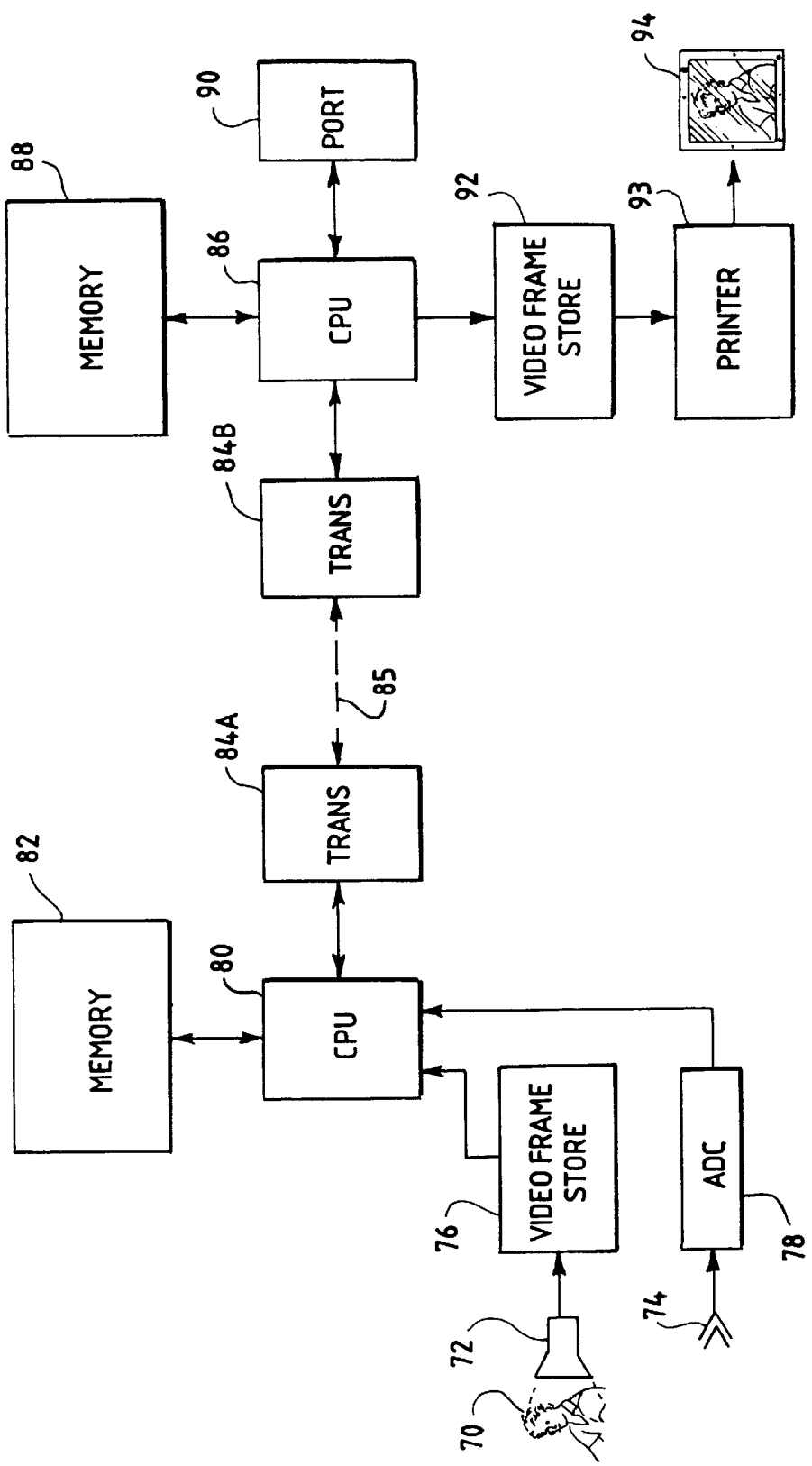
FIG. 4 is a diagram of an embodiment of the remote transmit/receive circuit of the present invention.

With reference to FIG. 4, a system and method for remotely transmitting pictures and audio messages for use in the present invention will now be described. Camera 72 electronically captures a suitable image, such as an image of person 70. Analog information from camera 72 is input to video frame store 76. Video frame store 76 can be any of a number of conventional devices for receiving the output of a video camera and producing an electrical representation (in the preferred embodiment digital) of a particular frame of the video image produced by the video camera. Under control of CPU 80, digital information output from video frame store 76, representing the desired picture or image information, is stored in memory 82. As with memory 32 of FIG. 2, memory 82 may be any suitable memory or digital storage device. In other embodiments, the desired picture already exists, and in lieu of camera 72, an electrical representation of the picture is produced by a conventional scanning device, the output of which is coupled to CPU 80.

The desired audio message is input to microphone 74, the analog output of which is input to ADC 78. Under control of CPU 80, the digital output of ADC 78 representing the desired audio message is stored in memory 82.

Under control of CPU 80, digital information representing the audio message and desired the picture is retrieved from memory 82 and transmitted to transceiver 84A. Transceiver 84A transmits this digital information over transmission link 85 where it is subsequently received by transceiver 84B. Transceiver 84A and 84B and transmission link 85 may be any suitable combination of devices and media such that digital information may be transmitted from one point to a remote location. In the preferred embodiment, transceivers 84A and 84B are conventional modems, and transmission medium 85 is an ordinary phoneline. Also in the preferred embodiment, CPU 80 and CPU 86 perform coordinated error checking and correction in a conventional manner to ensure the integrity of the transmitted digital information. In other embodiments, high speed digital and/or analog transmit and receive devices are used over suitable media, such as dedicated phone lines, dedicated data lines, satellite links and the like.

The information received from transceiver 84B is stored in memory 88 under control of CPU 86. Also under control of CPU 86, digital information representing a desired picture or image (such as a picture of person 70) is transmitted to video frame store 92. Video frame store 92 may be any conventional device which produces an output suitable for input to printer 93. Printer 93 produces a hard copy form of the picture of the desired quality. Printer 93 can be a traditional photo generating device, hard copy video printer or a high quality inkjet graphics printer or the like. The output of printer 93 is a hard copy picture, such as picture 94.

Picture 94 may be then utilized such as picture 2 in FIG. 1A or one of pictures 20 of FIG. 1B. Under the control of CPU 86, digital information representing the audio message can be output from port 90 to a suitable storage device. Such a storage device can be memory 32 (under control of CPU 30) of FIG. 2, or it can be storage circuit 100 of FIG. 3. Audio message playback can then be initiated as discussed with respect to FIGS. 1A, 1B, FIG. 2 and 3. For use with the embodiment of FIG. 1B, multiple pictures and multiple audio messages are transmitted and received using the circuit of FIG. 4.

CPU 80 and CPU 86 are illustrated in FIG. 4 electrically connected to other circuit elements by way of separate wires or buses. In other embodiments CPU 80 and CPU 86 are electrically connected to other circuit elements by way of a single bus similar to CPU 30 of FIG. 2.

Figure 5:
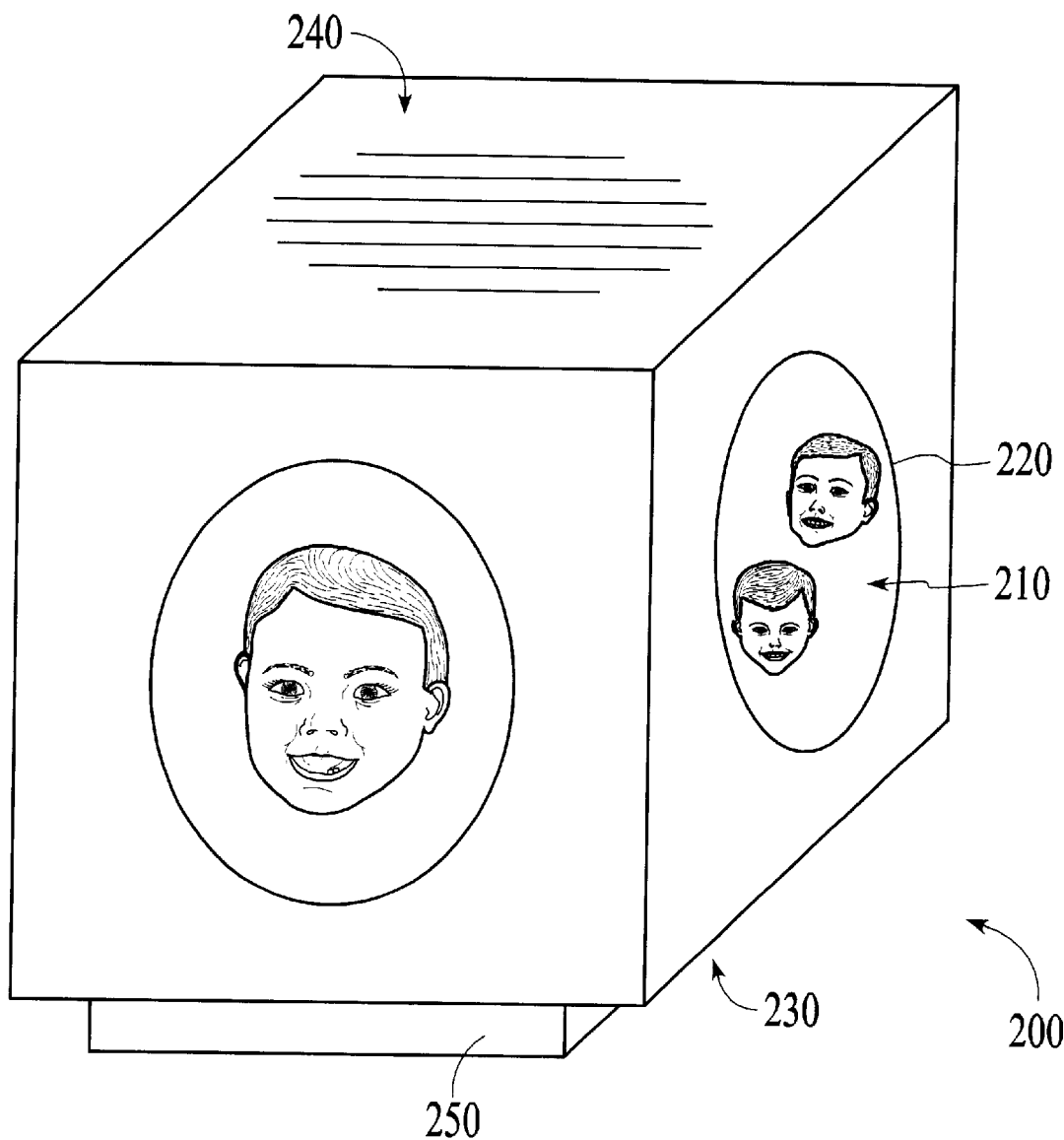
FIG. 5 is diagram illustrating a multi-picture embodiment of the present invention in which the frame is of a geometric shape such as a cube.

FIG. 5 illustrates yet another embodiment of the present invention. As illustrated in FIG. 5, the present invention may be implemented in the form of a geometric shape, such as cube 200, with multiple faces 210 that may hold one or more pictures, such as picture 220. Cube 200 may be mounted on pedestal 250, although in other embodiments pedestal 250 is not provided. Under pedestal 250 is located microphone 230, which is optimally provided close to the surface on which the cube rests. It has been discovered that such microphone positioning can provide desirable recording characteristics in such embodiments. Speaker 240 in the illustrated embodiment is located within the top face of cube 200, although in other embodiments speaker 240 may be built within pedestal 250.

In the preferred implementation of this embodiment, multiple faces are provided in the geometrically shaped frame, and multiple messages are included in the audio message circuit, with one or more messages associated with each picture/face of the geometric shape. Touch sensitive or sensor switches are located correspondingly with each picture/face of the geometric shape, so that audio message playback of a message associated with a particular picture/face of the geometric shape may be initiated by directly touching that picture or face. In other embodiments, non-sensor switches (such as switches 26 of FIG. 1B) are used instead of sensor switches. As with other embodiments described herein, multiple messages may be associated with a single picture/face of the geometric shape, with playback of the multiple messages initiated by multiple activations of the corresponding switch (i.e., multiple message scrolling with multiple switch activations, etc.).

In such embodiments, the control electronics and other elements of the audio message circuit and related components such as the speaker, microphone and battery, etc., may be conveniently positioned within the interior of the cube or other geometric shape.

In yet other embodiments, one face of the geometric shape (e.g., the top face) may contain a clock having an alarm function. In such embodiments, the alarm time may cause initiation of message playback, which may be a message particularly corresponding to a particular picture or the clock alarm. Such a clock and alarm may be readily implemented in a variety of ways by one of skill in the art.

Figure 6:
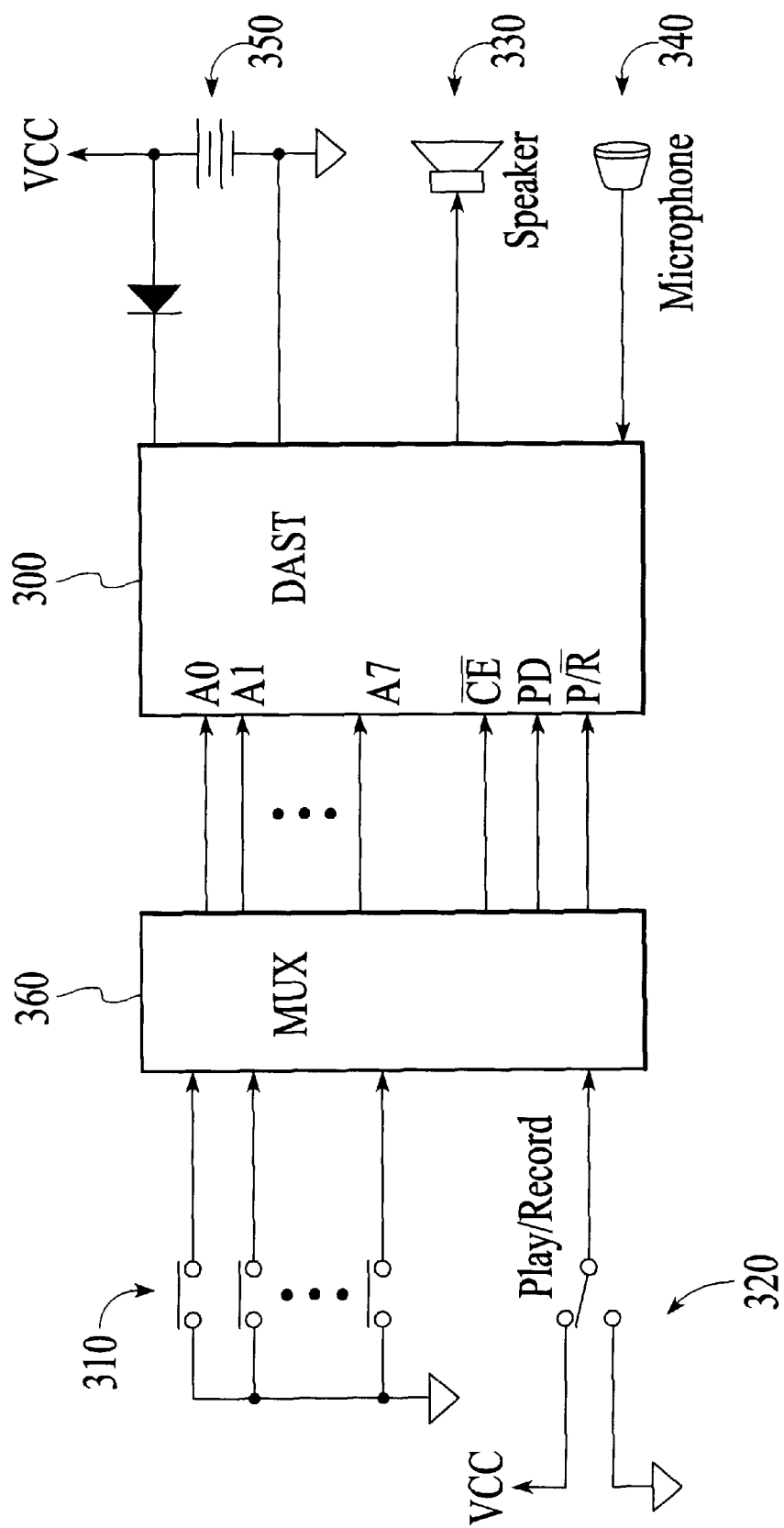
FIG. 6 is a diagram of another embodiment of the present invention.

Electronics that may be used for alternate embodiments are illustrated in FIG. 6. Such embodiments utilize a Direct Analog Storage Technology (DAST) device (300) such as that manufactured by Information Storage Devices for recording, storing and subsequently playing the recorded messages. The DAST can store up to 20 seconds worth of audio messages that can be played as one 20 second message or that can be divided into a plurality of shorter messages. DASTs can also (not shown) be cascaded to provide up to one minute of record/play time. In other embodiments, different message lengths are utilized.

A plurality of switches 310 are input into digital multiplexing circuitry 360 that converts the switch inputs into an address for selecting the start address of DAST 300. Each picture may have one switch associated with it. When the user wishes to hear a message for a particular picture the user touches the picture (which may be a sensor switch) or the other switch associated with the picture. Digital multiplexing circuitry 360 decodes the switch input and provides an address to DAST 300 and also provides the corresponding control signals to DAST 300 to cause it to play a particular pre-recorded message. The audio is played through speaker 330. Power to DAST 300 is provided by battery 350, or can alternately be provided by a low voltage DC power supply.

When a user wishes to record a message play/record switch 320 is placed to the record position. The user then touches the picture or picture switch associated with a picture and speaks into microphone 340. Digital multiplexing circuitry 360 decodes the picture switch selected and provides an address to DAST 300 and provides the control signals signaling DAST 300 to record a message. When the message is complete, play/record switch 320 is returned to the play position. A plurality of messages associated with either a plurality of pictures or a plurality of messages for one picture can be recorded utilizing the above procedure.

Other embodiments of the present invention will now be described with reference to FIGS. 7–9. In such alternative embodiments, the picture frame may include a position sensitive device, which may be used to advantageously record and playback audio messages in accordance with the present invention.

Figure 7:
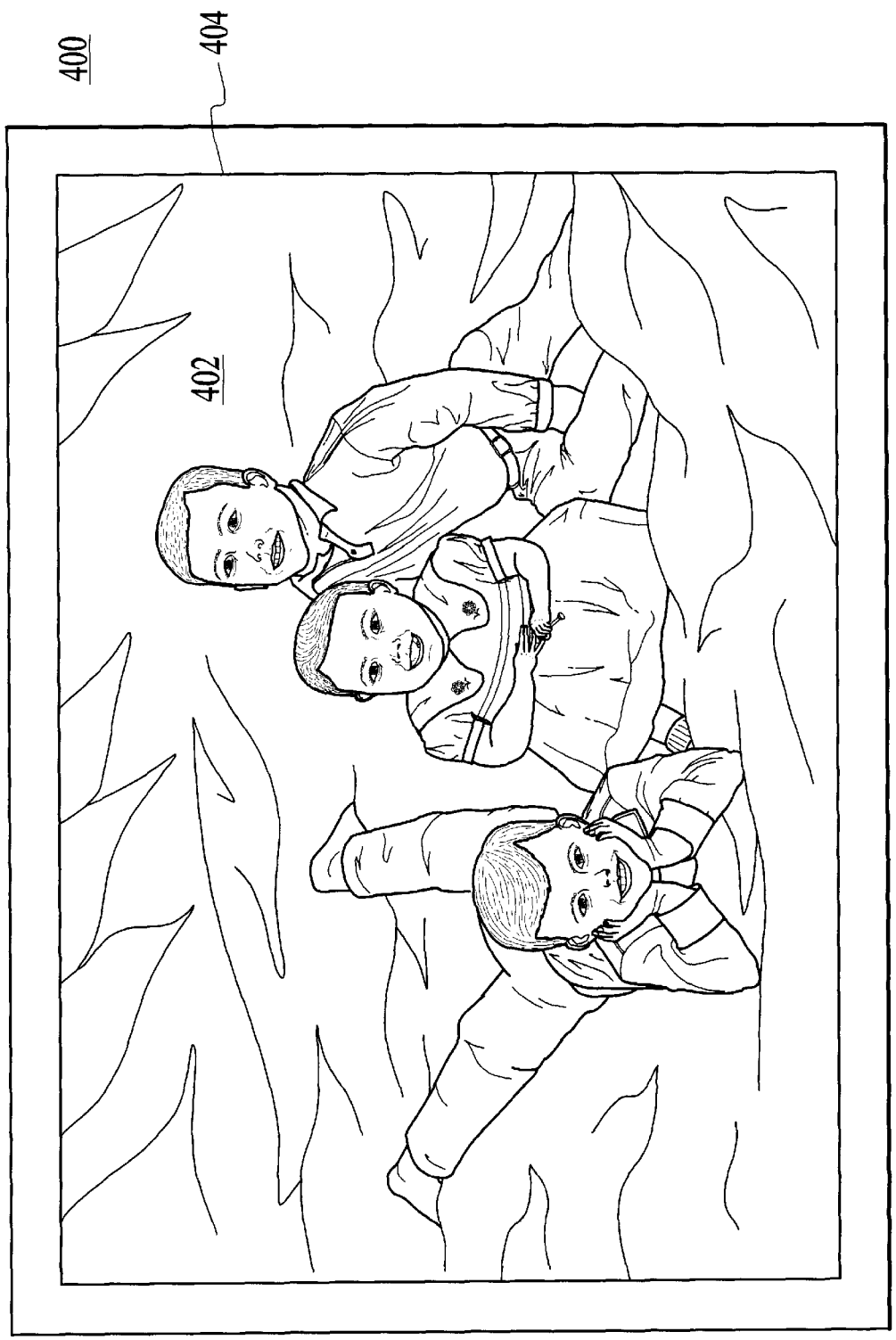
FIG. 7 is a diagram of an embodiment with a picture (or plurality of pictures) positioned behind a transparent touch screen, as an exemplary position sensitive device.

Referring to FIG. 7, a picture (or pictures) may be positioned behind transparent touch screen 404, as an exemplary position sensitive device. Touch screen 404 and picture 402) may positioned inside (or as a part of) frame 400 as illustrated.

Figure 8:
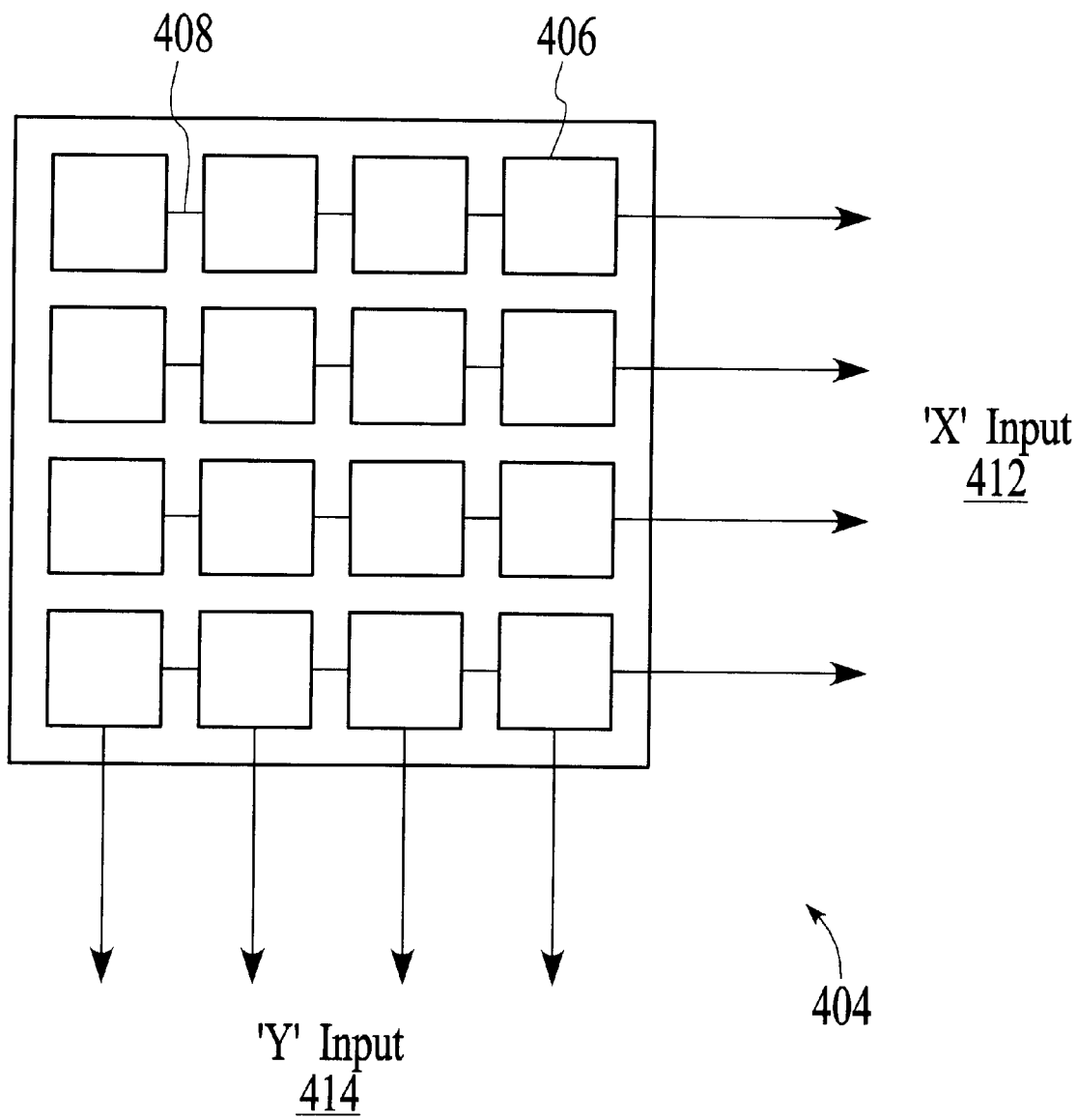
FIG. 8 is a diagram of an exemplary transparent touch screen position sensitive device that may be used in certain embodiments of the present invention.

As illustrated in FIG. 8, touch screen 404 may be, for example, of conventional resistive design and sensitive to pressure and position. It may be constructed of two layers of transparent resistive material, each having rectangular areas 406 connected by thin conductive strips. In this exemplary embodiment, one layer has horizontally connected strips 408 (the 'X' layer), the other layer (the 'Y' layer) has vertically connected strips (not specifically shown). The two layers are physically separated from each other by a transparent material (not shown) containing a matrix or other pattern of holes, which serves to hold the two layers apart from one another until pressure is applied to the touch screen. When pressure is applied, such as from a finger, Ohmic contact will be made on one or more of the pairs of rectangular areas 406, where the pairs of areas are the areas formed on the 'X' layer and 'Y' layer, respectively. The position of the finger is determined by determining which rectangular area pair is making Ohmic contact. This may be done in a conventional matrix switch manner by applying a voltage to each of the 'X' inputs 412 sequentially and measuring a current (or voltage) on each of the 'Y' inputs 414. If a voltage is detected on any of the 'Y' inputs when a voltage is applied to any of the 'X' inputs, then the location of the finger can be determined. Note that the layers of touch screen 404 can be reversed. Voltage may be applied either to the 'X' layer or to the 'Y' layer and measured on the opposite layer. Thus, the signal lines for both the 'X' layer and 'Y' layer are labeled as inputs, even though one or the other layer typically will serve as an output. Additionally, although FIG. 8 illustrates 16 rectangular contact areas, more or fewer areas may be utilized in touch screen 404. The areas also need not be rectangular but may be square, round or any other desired shape.

Figure 9:
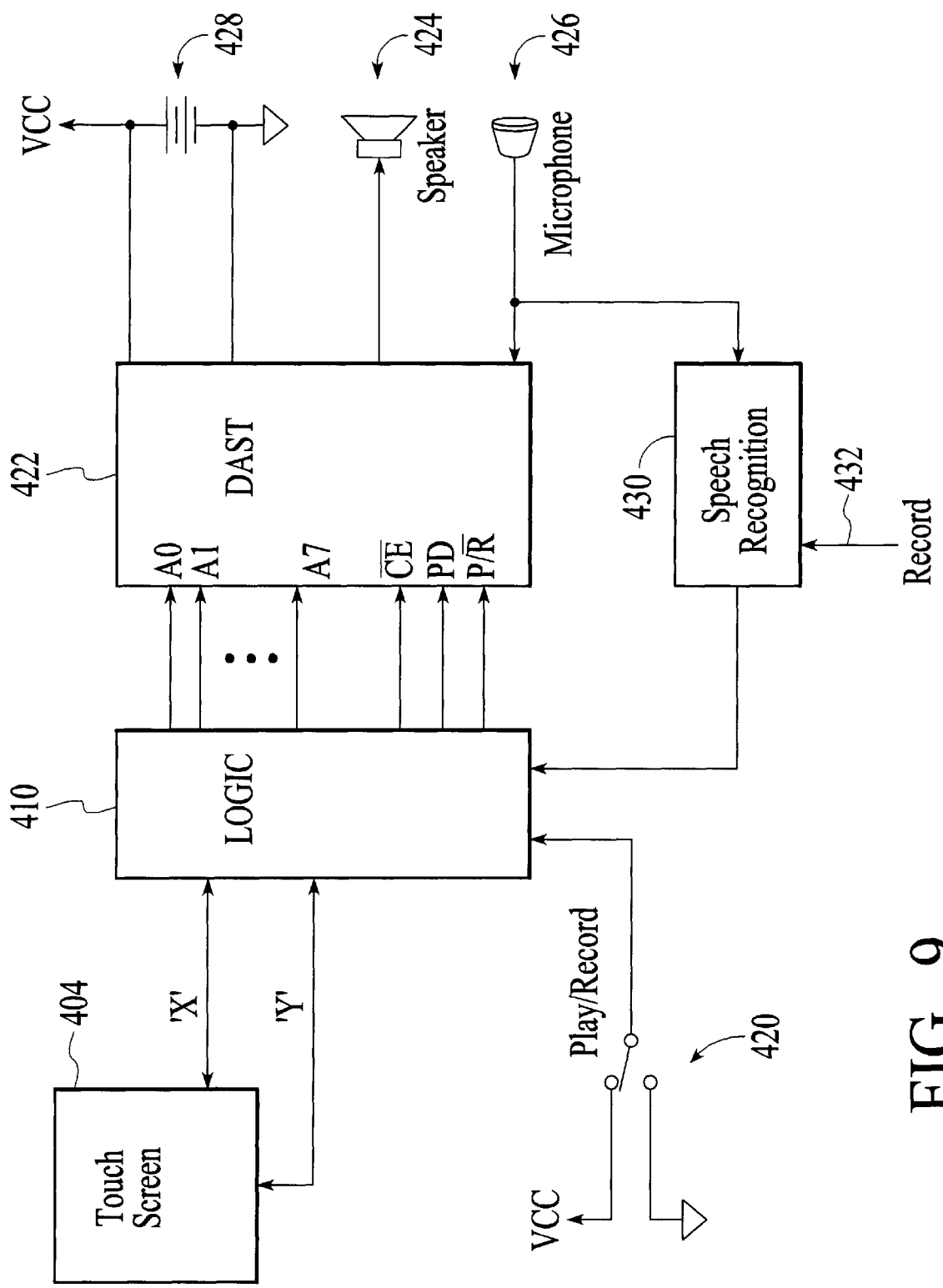
FIG. 9 is a diagram illustrating an embodiment of electronics utilizing a touch screen type of position sensitive device in accordance with the present invention.

FIG. 9 illustrates an embodiment of electronics that may be used to decode signals from touch screen 404 and to record and play messages utilizing Digital Analog Storage Device 422, which may be a DAST as described earlier. Logic element 410 may include a RISC processor such as a PIC16C57 manufactured by Microchip, or it may be an FPGA (Field Programmable Gate Array) or any other logic element suitable for decoding such switch arrays. Logic element 410 also includes play/record switch input 420. Play/record switch 420 is utilized to select whether the system operates in play-back mode (to play pre-recorded messages) or in record mode (to record and store messages). A plurality of messages may be stored in DAST 422. Coupled to DAST 422 are speaker 424, microphone 426 and battery/power supply 428, all of which may be constructed and operate as described earlier.

Referring again to FIG. 7, picture 402 may include a plurality of subjects (e.g., persons), and may have a plurality of messages associated with the subjects. The messages may be recorded in such an embodiment by switching play/record switch 420 to the record position and pressing touch screen 404 at a desired location associated with the new message. The system then records the new message as it is input into microphone 426. With such an embodiment, messages may be positionally associated to desired or corresponding locations of the displayed picture. The length of the message may vary depending upon how many messages are stored in the system and the size of memory in DAST 422 (which may be constructed to be of the desired size, etc.). A second message may be recorded by touching a second area on touch screen 404 and recording a second message associated with that particular portion of the picture. A third message and fourth message and so on may be recorded for different areas of the picture. Logic element 410, in effect, records an address or pointer for each of the messages stored in DAST 422, and records or initiates playback by providing such address or pointer, along with any necessary control signals, to DAST 422. When all messages have been recorded, play/record switch 420 may be switched to the play position.

The system then plays a particular message whenever an area of the picture corresponding to that message is pressed by a user. In certain embodiments, if a specific area is pressed and such specific area does not have a message associated with it, the system plays no message. In other embodiments, the system may be programmed to play a generic message (pre-recorded by the user as described above, such as with a separate record switch or other implement to indicate a generic, or non-position specific message) for those areas that do not have a specific message associated therewith. Such generic or non-position specific messages may be group greetings or the like.

In an alternate embodiment, transparent touch screen 404 is replaced by a membrane switch panel of conventional design. Such a membrane switch panel position sensitive device may be located behind the picture, and may have a plurality of switches covering the area where a picture or pictures are to be displayed. Such a membrane switch panel may be decoded in a manner similar to the touch screen described above, and operated in a similar manner.

In yet another embodiment, transparent touch screen 404 is replaced by a capacitive type "continuous" touch screen, as are known in the art. What should be noted from the foregoing is that the type of touch screen or matrix of switches is not critical for such embodiments, although different methods may present different considerations from a constructional and cost point of view, etc. What is important is that a picture has a plurality of messages associated with it that can be recorded and subsequently played back by touching specific areas of the picture, thereby enabling position-specific messages to be associated with particular portions of a displayed picture. As an example, a picture may contain a number of persons, and one or more messages associated with each person may be recorded and played back by touching that person. Other advantageous uses of such embodiments will be apparent to those skilled in the art.

In an additional embodiment, the system has limited voice recognition capability, such as may be provided by voice recognition unit 430 of FIG. 9 Voice recognition unit 430, which may be of conventional design, receives an input from microphone 426. Signals from microphone 426 are input to voice recognition unit 430, which attempts to find a match between the input signal and previously stored "commands" or "key words/phrases", which are recorded in voice recognition unit 430, using record command input 432. Record command input 432 is used to store in voice recognition unit 430 certain speech patterns that may be recognized and used, for example, to initiate particular message playback. For example, if a displayed picture (or pictures) includes several people, playback of a specific pre-recorded message associated with a particular person maybe initiated by a voice command that is recognized by voice recognition unit 430. For example, a message associated with a person in a displayed picture who is named Susan may be played back by saying "hello Susan" for example. Upon recognition of "hello Susan" by voice recognition unit 430, a message associated with Susan will be played through speaker 424, by way of a command from voice recognition unit 430, which may be coupled to logic element 410. Similarly, a message associated with "John" who may be in the same picture may be played back by saying "hello John". The storing of the command may occur prior to, or after, storing of the audio message associated with that command. Such a voice recognition embodiment may be used with or without combination with a position sensitive device such as touch screen 404.

In yet another embodiment, multiple messages are associated with specific areas of the picture. In this embodiment, two or more messages may be associated with a particular positional area. The messages may be stored in a manner as previously described. The first time that an area of a displayed picture or pictures is selected, the first message is recorded. The second time that an area of the displayed picture or pictures is selected, the second message is recorded, and so on. In playback mode, the first time that an area is selected the first message is played. The second time that the area is selected the second message is played, and so on. A control input (not explicitly shown) coupled to logic element 410 may be used to controllably select or activate such a multiple message mode of operation.

Additionally, it will be understood that such additional embodiments may be combined with previously described embodiments to provide picture frames with associated audio message capability of various desired functions and features, all in accordance with the present invention.

While the present invention has been described in terms of preferred and alternative embodiment, it will be obvious to one skilled in the art that many alternations and modifications may be made without substantially departing from the spirit of the invention. Accordingly, it is intended that all such alternations and modifications be included in the spirit and scope of the invention as defined by the appended claims.

Reference is made to copending application Ser. No. 08/617,708, filed Apr. 1, 1996, and its parent application Ser. No. 08/121,955, U.S. Pat. No. 5,504,836, and its parent application Ser. No. 07/711,153, filed Jun. 6, 1991, now abandoned. This application is a continuation-in-part of the foregoing applications.

We claim:

1. A method for remotely producing a talking article having an audio message circuit storing one or more audio messages at a second location remote from a first location, wherein one or more switches and a speaker are provided with the article for playback of the one or more audio messages through the speaker, the method comprising:

generating electrical representations corresponding to the one or more audio messages at the first location;

transmitting the electrical representations over a transmission medium, wherein the electrical representations generated at the first location are transmitted to the second location remote from the first location;

receiving the electrical representations at the second location; and storing the electrical representations of the one or more audio messages in the audio message circuit in the article at the second location, wherein the one or more audio messages are played back through the speaker by activation of one of the one or more switches.

2. The method of claim 1, wherein the article comprises a sketch, drawing, lettering, photograph or fixed object.

3. The method of claim 1, wherein the one or more audio messages is/are input into or stored in the audio message circuit in digital or analog form.

4. The method of claim 1, wherein the one or more audio message is/are input into the audio message circuit via a microphone or input port.

5. The method of claim 1, wherein the one or more audio messages comprise a recorded voice message of a user.

6. The method of claim 5, wherein the article is delivered to a recipient of the article at a third location remote from the first location, wherein the recipient plays back the recorded voice message of the user, originally generated at the first location, at the location remote from the first location.

7. The method of claim 1, wherein the one or more switches comprise one or more touch sensitive switches.

8. The method of claim 7, wherein the one or more touch sensitive switches comprise capacitive or membrane type switches.

9. The method of claim 7, wherein the one or more touch sensitive switches comprise switches that are unnoticeable to a user.

10. The method of claim 1, wherein the one or more switches comprise at least two switches.

11. The method of claim 10, wherein the one or more audio messages comprise at least two audio messages.

12. The method of claim 11, wherein a first audio message is played back in response to activation of a first switch, wherein a second audio message is played back in response to activation of a second switch.

13. The method of claim 1, wherein the one or more touch sensitive switches comprise a light activated switch.

14. The method of claim 13, wherein a predetermined audio message is played back in response to activation of the light activated switch.

15. The method of claim 14, wherein a first audio message is played back in response to activation of a first switch, wherein the predetermined audio message is played back in response to the activation of the light activated switch.

16. The method of claim 15, wherein he first audio message and the predetermined audio message comprise different audio messages.

17. The method of claim 1, wherein the transmission medium comprises a telephone line or a data line or satellite link.

18. The method of claim 1, wherein the electrical representations are transmitted or received using digital or analog transmit or receive devices.

19. The method of claim 1, wherein the article including the stored one or more audio messages is delivered to a predetermined user at a location remote from the first location.

20. The method of claim 19, wherein the one or more audio messages comprise a commemorative message.

21. The method of claim 20, wherein the article comprises a sketch, drawing, lettering, photograph or fixed object.

22. The method of claim 1, wherein the article comprises a commemorative object including at least the sketch, drawing, lettering, photograph or fixed object and the audio message circuit storing at least the commemorative message is produced and delivered at a location remote from the fist location.

23. The method of claim 1, wherein the audio message circuit comprises a memory or an analog storage device.

24. The method of claim 1, wherein the article comprises a picture display device displaying one or more pictures.

25. The method of claim 24, wherein the picture display device is substantially in the form of a geometric shape.

26. The method of claim 25, wherein the picture display device displays a plurality of pictures.

27. The method of claim 26, wherein an audio message is associated with each of the plurality of displayed pictures.

28. The method of claim 24, wherein the picture display device includes at least one face that includes a clock element.

29. The method of claim 28, wherein one or more audio messages are played back in response to a signal from the clock element.

* * * * *